(12) United States Patent
Ishikawa

(10) Patent No.: US 9,902,514 B1
(45) Date of Patent: Feb. 27, 2018

(54) BAG FEEDING DEVICE AND PACKAGING MACHINE PROVIDED THEREWITH

(71) Applicant: General Packer Co., Ltd., Kitanagoya-shi, Aichi (JP)

(72) Inventor: Shinji Ishikawa, Kitanagoya (JP)

(73) Assignee: General Packer Co., Ltd., Kitanagoya-shi, Aichi (JP)

( * ) Notice: Subject to any disclaimer, the term of this patent is extended or adjusted under 35 U.S.C. 154(b) by 0 days.

(21) Appl. No.: 15/361,029

(22) Filed: Nov. 24, 2016

(51) Int. Cl.
| | | |
|---|---|---|
| *B65B 43/42* | (2006.01) | |
| *B65B 43/00* | (2006.01) | |
| *B65B 43/12* | (2006.01) | |
| *B65B 59/00* | (2006.01) | |
| *B65G 21/20* | (2006.01) | |

(52) U.S. Cl.
CPC ............ *B65B 43/12* (2013.01); *B65B 59/005* (2013.01); *B65G 21/2072* (2013.01)

(58) Field of Classification Search
None
See application file for complete search history.

(56) References Cited

U.S. PATENT DOCUMENTS

| | | | | |
|---|---|---|---|---|
| 6,853,874 B2 * | 2/2005 | Kawada | ............ | H05K 13/0061 198/604 |
| 8,562,274 B2 * | 10/2013 | Murray | ................... | B65B 39/02 414/222.02 |

FOREIGN PATENT DOCUMENTS

| | | |
|---|---|---|
| JP | 2004-359310 A | 12/2004 |
| JP | 2006-111280 A | 4/2006 |
| JP | 4011567 B2 | 11/2007 |
| JP | 4149466 B2 | 9/2008 |
| JP | 2009-029446 A | 2/2009 |

OTHER PUBLICATIONS

Office action of the corresponding Japanese application No. 2014-124990 dated Nov. 17, 2017 and English translation thereof.

* cited by examiner

*Primary Examiner* — Kavel Singh
(74) *Attorney, Agent, or Firm* — Muncy, Geissler, Olds & Lowe, P.C.

(57) ABSTRACT

A bag feeding device includes a bag feed conveyor, a bag capture unit, a bag placement section and a bag supply unit. The bag feed conveyor is configured to sequentially convey packaging bags. The bag capture unit is configured to capture the sequentially conveyed packaging bags one by one. The packaging bags captured by the bag capture unit are placed on the bag placement section one by one. The bag placement section is provided with a bag position correction unit. The bag supply unit is configured to hold the packaging bag placed on the bag placement section to supply the packaging bag to a bag holding unit of a packaging machine.

8 Claims, 26 Drawing Sheets

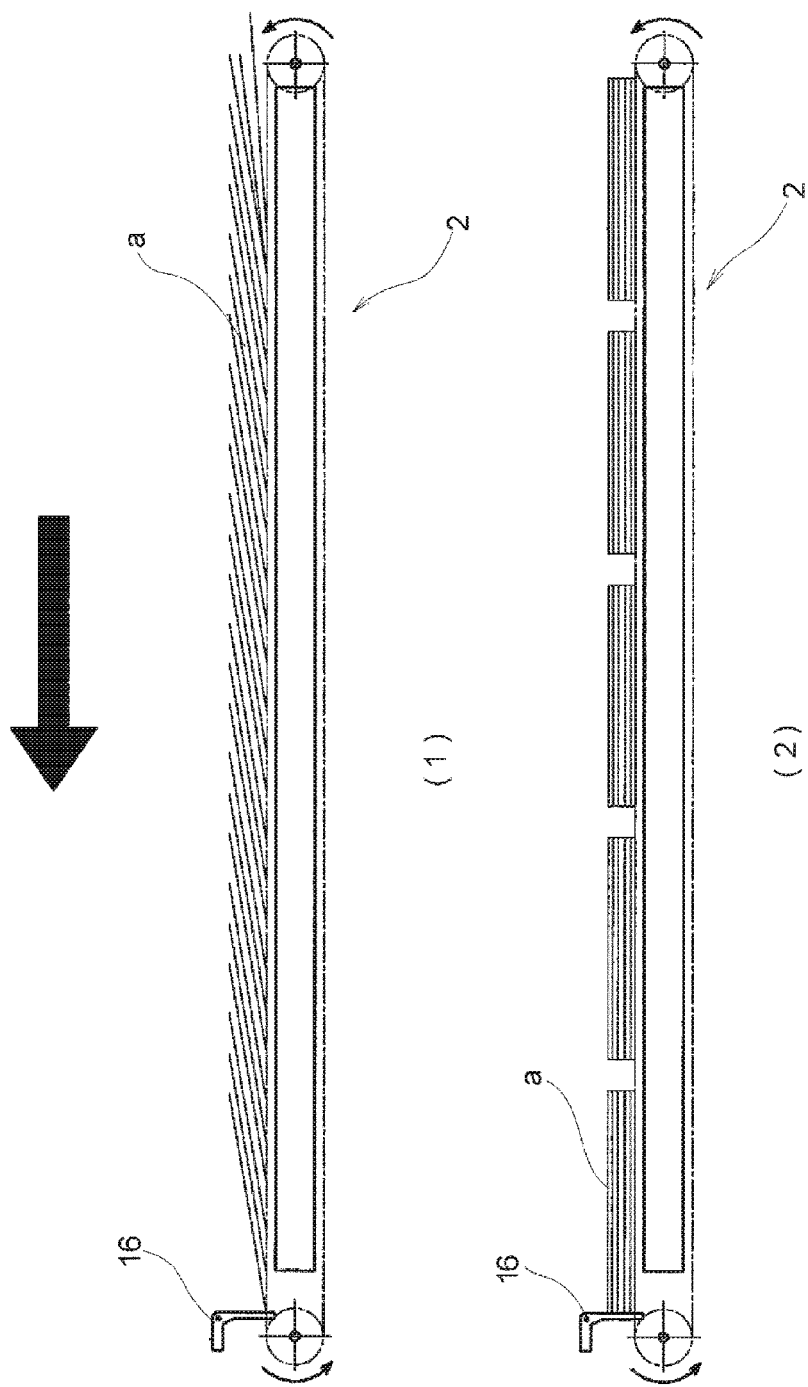

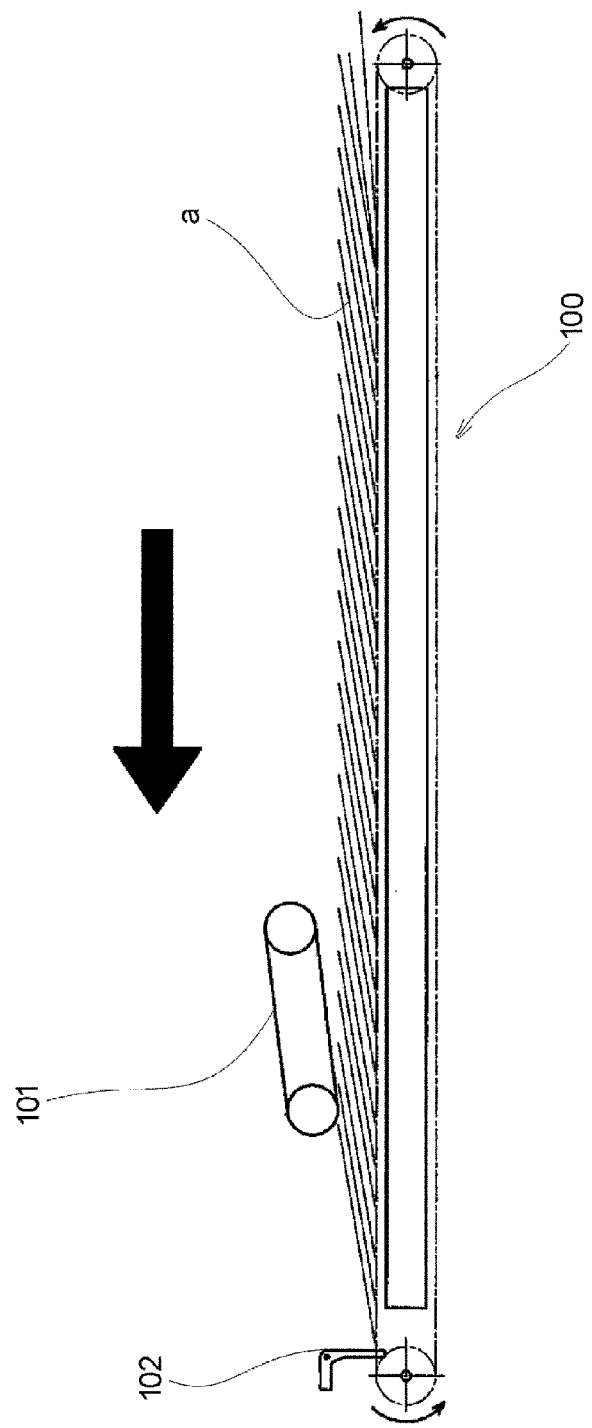

BAG FEEDING DEVICE AND PACKAGING MACHINE PROVIDED THEREWITH

BACKGROUND

1. Technical Field

The present disclosure relates to a bag feeding device versatilely usable to feed various types of packaging bags such as zip-fastener bags, gusset bags, flat bags and large-sized bags such as sacks and a packaging machine provided with the bag feeding device.

2. Related Art

Japanese Patent No. 4011567 discloses, as a packaging bag feeding system in packaging machines, a conveyor system in which packaging bags are sequentially fed by a conveyor. Japanese Patent No. 4149466 discloses, as another packaging bag feeding system, a magazine system in which packaging bags stacked one upon another are sequentially fed.

The zip-fastener bag generally has an upper part provided with a zip-fastener. Accordingly, the upper parts of the zip-fastener bags become bulky when the zip-fastener bags are stacked one upon another. Furthermore, since the gusset bag has two gussets formed on both sides respectively, both ends of the gusset bags become bulky when the gusset bags are stacked one upon another. Under these circumstances, when the zip-fastener bags or the gusset bags are stacked in a magazine of the bag feeding device, the bags cause warpage with the result that the bags cannot be fed in the magazine system. In view of this problem, the packaging bags are fed in a conveyor system as illustrated in FIG. 26. More specifically, packaging bags a are placed on a bag feeding conveyor 100 so as to be separated from one another little by little like "sashimi" or sliced pieces of raw fish in Japanese cooking. The packaging bags a are sequentially fed by the bag feeding conveyor 100 to a position where the bags a are detected by a bag distal end detector 102, while being loosened by a bag feed roller 101. On the other hand, the flat bags and the large-sized bags are loaded on a magazine in the bag feeding device in bundles thereby to be fed in the magazine system.

However, for example, when both the zip-fastener bags and the flat bags are fed, a bag feeding device provided with two bag feeding systems is required. Furthermore, in order that bags may exactly be fed in either the conveyor system or the magazine system, the packaging bags need to be placed on the bag feed conveyor or the magazine in unison. This placing manner requires complicated work, which imposes a burden on a worker.

SUMMARY

Therefore, an object of the present disclosure is to provide a bag feeding device which can versatilely be used to feed various types of packaging bags such as zip-fastener bags, gusset bags, flat bags and sacks and a packaging machine provided with the bag feeding device.

The present disclosure provides a bag feeding device including a bag feed conveyor, a bag capture unit, a bag placement section and a bag supply unit. The bag feed conveyor is configured to sequentially convey packaging bags. The bag capture unit is configured to capture the sequentially conveyed packaging bags one by one. The packaging bags captured by the bag capture unit are placed on the bag placement section one by one. The bag placement section is provided with a bag position correction unit. The bag supply unit is configured to hold the packaging bag placed on the bag placement section to supply the packaging bag to a bag holding unit of a packaging machine.

The above-described bag feeding device can widely be used for feeding various types of packaging bags including zip-fastener bags, gusset bags, flat bags and large-sized bags such as sacks. Furthermore, the burden on the worker can be reduced since the packaging bags are allowed to be roughly placed.

BRIEF DESCRIPTION OF THE DRAWINGS

In the accompanying drawings:

FIGS. 25(1) and 25(2) are diagrammatic views for explaining a method for using the bag feeding device of the embodiment; and FIG. 26 is a diagrammatic view for explaining a method for using a conventional bag feeding device.

DETAILED DESCRIPTION

Figure 1:
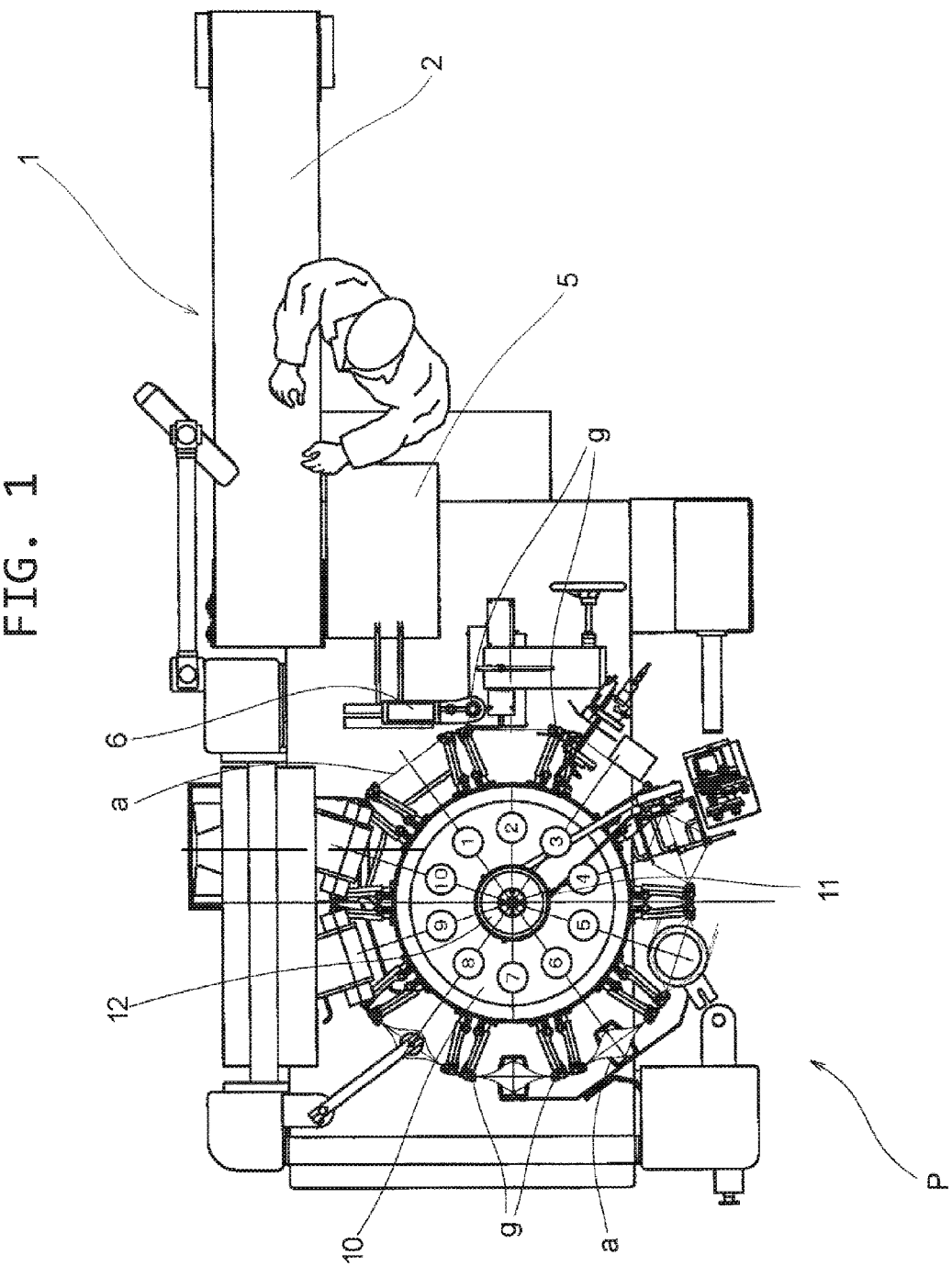
FIG. 1 is a schematic plan view of a packaging machine provided with a bag feeding device of one embodiment.

One embodiment will be described with reference to FIGS. 1 to 25 of the accompanying drawings. Referring to FIG. 1, an overall construction of a packaging machine P provided with a bag feeding device according to the embodiment is schematically illustrated. The packaging machine P is configured to open a bag mouth of a packaging bag a, to fill the packaging bag a with articles and to seal the packaging bag a. As illustrated in FIG. 1, the packaging machine P carries out ten processes at respective stations, that is, a bag feeding step (1) of feeding the packaging bags a to the packaging machine P, a chuck opening/printing step (2) of opening a chuck of a zippered packaging bag and printing on the packaging bag a, a print checking/bar code certifying step (3) of checking the printing and certifying bar-code, a bag mouth opening step (4) of opening a bag mouth of the packaging bag a, a filling step (5) of filling the packaging bag a with articles, a vibrating step (6) and (7) of applying vibration to the articles in the packaging bag a, a pushing/blasting step (8) of pushing and blasting the articles off, a top sealing/deflating step (9) of horizontally sealing the vicinity of bag mouth and deflating the packaging bag a, a seal cooling/product discharging step (10) of cooling the top seal and discharging the packaging bag a filled with the articles outside the machine. Although the packaging machine P used in the embodiment is of a rotary type, the packaging machine P may be of a rectilinear travel type as well known in the art.

The packaging machine P includes a stand 11 which is mounted on a machine base to rotatably support an intermittent rotating shaft 12 extending vertically, as illustrated in FIG. 1. A moving body (disk-shaped rotating body) 10 is mounted on an upper part of the intermittent rotating shaft 12. Ten bag holding units (paired grips) g are provided on the moving body 10 to seize or release the packaging bag a. The bag holding units g are mounted on the moving body 10 so as to protrude radially at regular intervals about the intermittent rotating shaft 12. In the bag feeding step (1), the packaging bags a are taken by a bag feeding device 1. More specifically, the packaging bags a are supported onto the bag holding units g intermittently moved sequentially into the bag feed station, whereby the packaging bags a assume a vertical posture in a suspended state.

Figure 2:
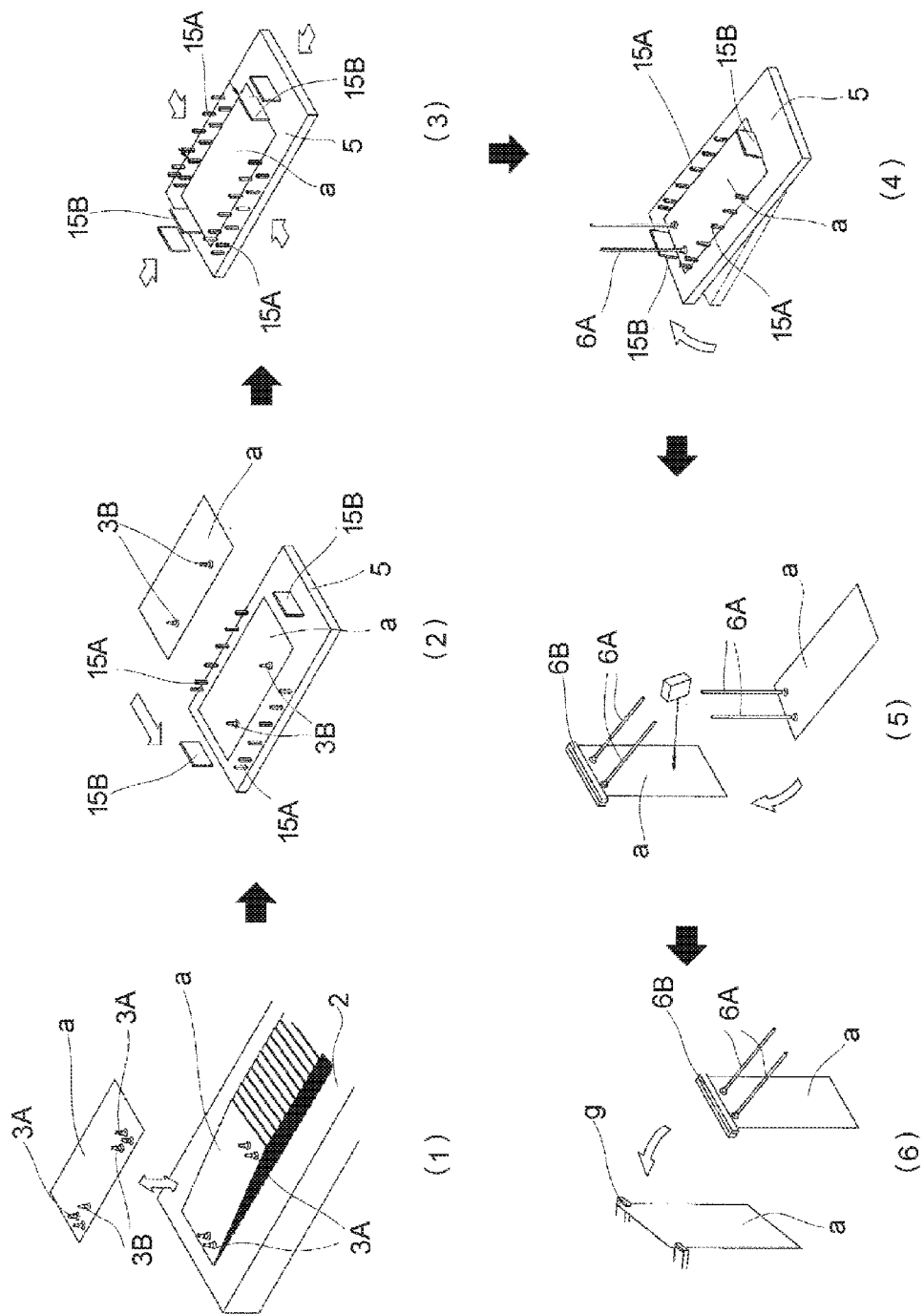
FIGS. 2(1)-2(6) are diagrammatic views explaining a bag feeding process of the bag feeding device illustrated in FIG. 1.

The bag feeding device 1 of the packaging machine P includes, as illustrated in FIG. 1 or 2, a bag feed conveyor 2 sequentially feeding the packaging bags a, a first capture unit 3A and a second capture unit 3B each capturing the packaging bags a sequentially fed on the bag feed conveyor 2, one by one, a bag placement section 5 in which each packaging bag a captured by the first and second capture units 3A and 3B is placed and which includes bag position correction units 15A and 15B, a first bag supply unit 6A and a second bag supply unit 6B each holding the single packaging bag a placed on the bag placement section 5 to supply the packaging bag a to the bag holding unit g of the packaging machine P.

The bag feeding device 1 sequentially supplies the packaging bags a to the bag holding units (paired grips) g in order to supply the packaging bags a to a subsequent packaging process. The bag feeding device 1 carries out a bag supplying process including six steps, that is, (1) a step of sequentially feeding the packaging bags a to the downstream side by the bag feed conveyor 2 (refer to FIG. 2(1), 2(2) a step of capturing one of the packaging bags a stacked on the bag feed conveyor 2 by the bag capture units 3A and 3B (refer to FIGS. 2(1) and 2(2)), 2(3) a step of conveying the packaging bag a captured by the bag capture units 3A and 3B to the bag placement section 5 (refer to FIG. 2(2)), 2(4) a step of correcting a position of the packaging bag a transferred to the bag placement section 5, by the bag position correction units 15A and 15B (refer to FIG. 2(3)), (5) a step of passing the packaging bag a held by the first bag supply unit 6A to the second bag supply unit 6B (refer to FIGS. 2(3)), and (6) a step of passing the packaging bag a from the second bag supply unit 6B to the paired grips g after correction of the height of the packaging bag a during transfer to the bag holding unit (the paired grips) g of the packaging machine P.

The structure of the bag feeding device 1 will be described in detail. The bag feed conveyor 2 is provided for sequentially conveying the packaging bags a. The bag feed conveyor 2 employed in the embodiment has a conveyor width adjusting mechanism 20 for adjusting a width of the bag feed conveyor 2.

Figure 5:
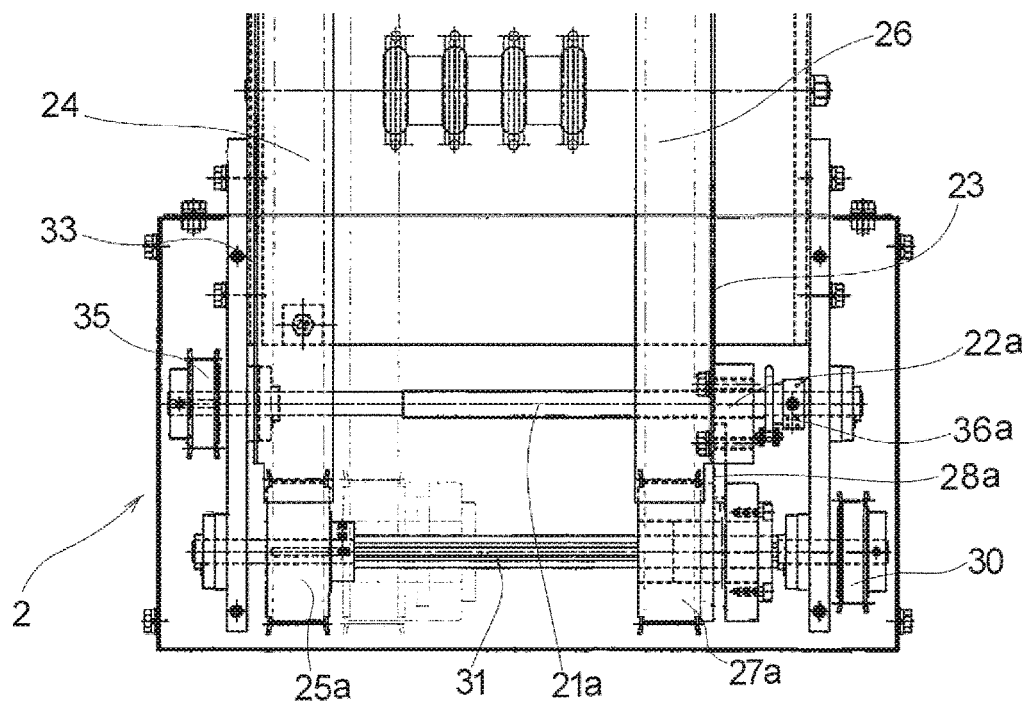
FIG. 5 is a schematic plan view of the vicinity of upstream end of the bag feed conveyor of the bag feeding device as illustrated in FIG. 1.
Figure 8:
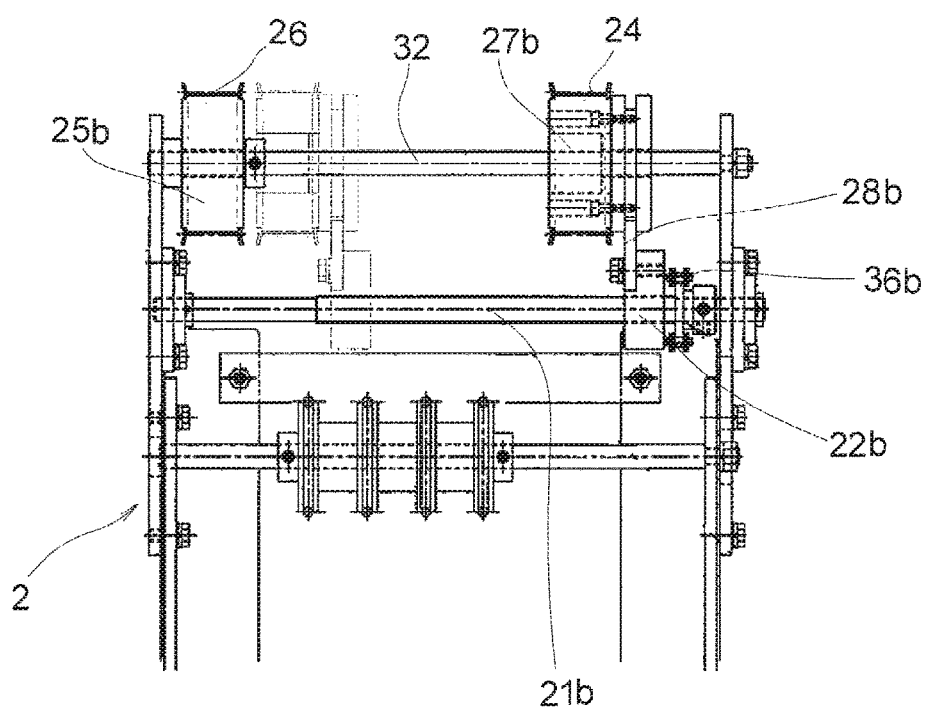
FIG. 8 is a schematic plan view of the vicinity of downstream end of the bag feed conveyor of the bag feeding device as illustrated in FIG. 1.

The conveyor width adjusting mechanism 20 has width adjusting screws 21a and 21b provided near an upstream end or an downstream end of the bag feed conveyor 2 so as to be rotatable in a width direction with respect to the bag feed conveyor 2 and screw receiving members 22a and 22b mounted on the width adjusting screws 21a and 21b and movable in the width direction with respect to the bag feed conveyor 2 with the rotative movement of the width adjusting screws 21a and 21b, respectively, as illustrated in FIG. 5 or 8. The conveyor width adjusting mechanism 20 also has a movable stock guide 23 movable in the width direction with respect to the bag feed conveyor 2 and fixed side pulleys 25a and 25b both of which are provided at one widthwise end side near the upstream or downstream end of the bag feed conveyor 2 and between which a first conveyor belt 24 extends. The conveyor width adjusting mechanism 20 further has movable side pulleys 27a and 27b both of which are provided at the other widthwise end side near the upstream or downstream end of the bag feed conveyor 2 and between which a second conveyor belt 24 extends. The movable side pulleys 27a and 27b are engaged with width adjusting guide members 28a and 28b provided on the screw receiving members 22a and 22b, so that the movable side pulleys 27a and 27b are movable in the width direction with respect to the bag feed conveyor 2 with widthwise movement of the screw receiving members 22a and 22b, respectively.

The bag feeding device 1 of the embodiment is provided with the above-described conveyor width adjusting mechanism 20. Accordingly, the width of the bag feed conveyor 2 is adjustable according to the bag width with the result that packaging bags having various dimensions can be fed. Furthermore, since the bag placement section 5 is adjacent to the widthwise end of the bag feed conveyor 2, the packaging bag a can be pulled to the end side. Furthermore, the conveyor width can easily be adjusted by the conveyor width adjusting mechanism 20, and the conveyor width adjusting mechanism 20 can be realized by a simple structure.

Figure 3:
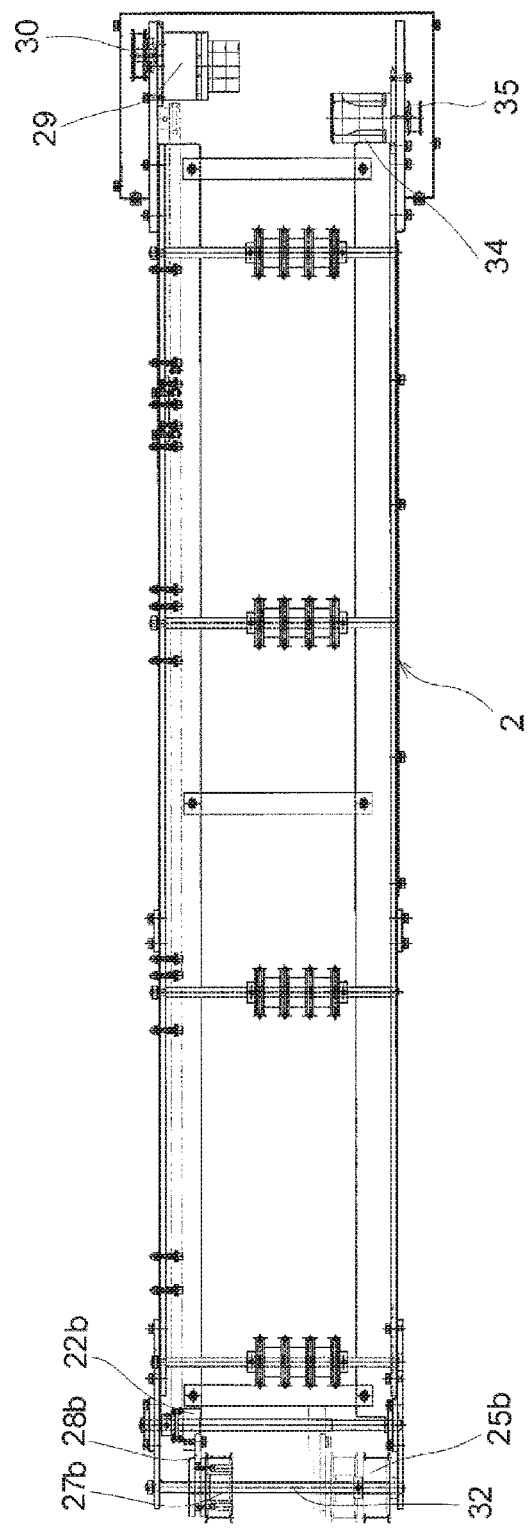
FIG. 3 is a schematic plan view of a bag feed conveyor of the bag feeding device as illustrated in FIG. 1.

More specifically, the bag feed conveyor 2 provided with the conveyor width adjusting mechanism 20 has a bag convey motor 29 on the upstream end thereof as illustrated in FIG. 3. A rotative force of the bag convey motor 29 is transmitted to a drive shaft 31 (a ball spline shaft) through a bag convey driving pulley 30 as illustrated in FIG. 3 or 5. The fixed side pulleys 25a and 25b are fixed to the drive shaft 31 and the one widthwise end of a downstream pulley shaft 32 (refer to FIG. 8) provided on the downstream end. The movable side pulleys 27a and 27b are mounted to the other widthwise end. Furthermore, the first conveyor belt 24 extends between the fixed side pulleys 25a and 25b. The second conveyor belt 26 extends between the movable side pulleys 27a and 27b.

Figure 6:
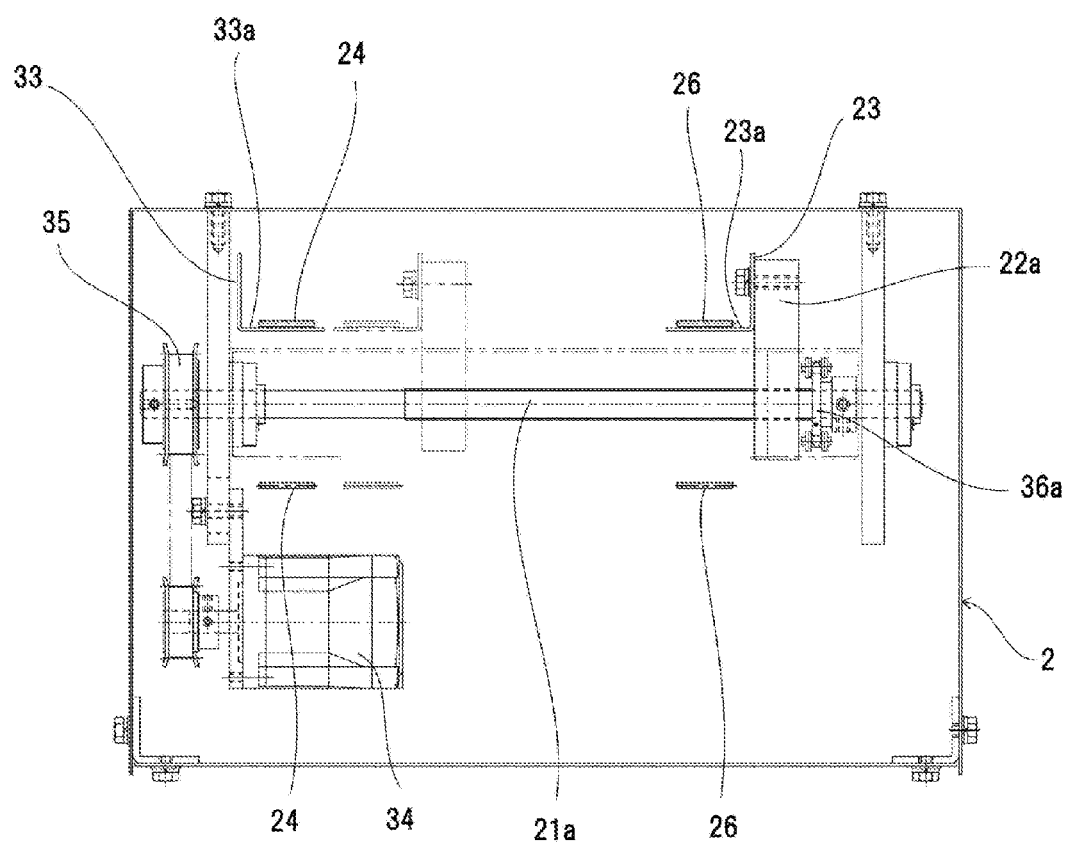
FIG. 6 is a schematic front view of the vicinity of upstream end of the bag feed conveyor of the bag feeding device as illustrated in FIG. 1.
Figure 9:
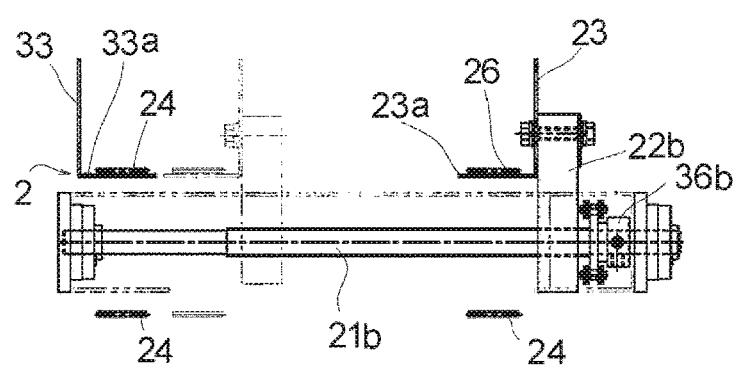
FIG. 9 is a schematic front view of the vicinity of downstream end of the bag feed conveyor of the bag feeding device as illustrated in FIG. 1.

The first conveyor belt 24 and the second conveyor belt 26 are configured to be rotated above a flat portion 33a of the fixed stock guide 33 or a flat portion 23a of the movable stock guide 23, as illustrated in FIG. 6 or 9. Upon drive of the bag feed motor 29, the first and second conveyor belts 24 and 26 are rotated synchronously so that the packaging bag a placed on the flat portions 33a and 23a of the respective fixed and movable stock guides 33 and 23 is conveyed from the upstream side to the downstream side.

Figure 4:
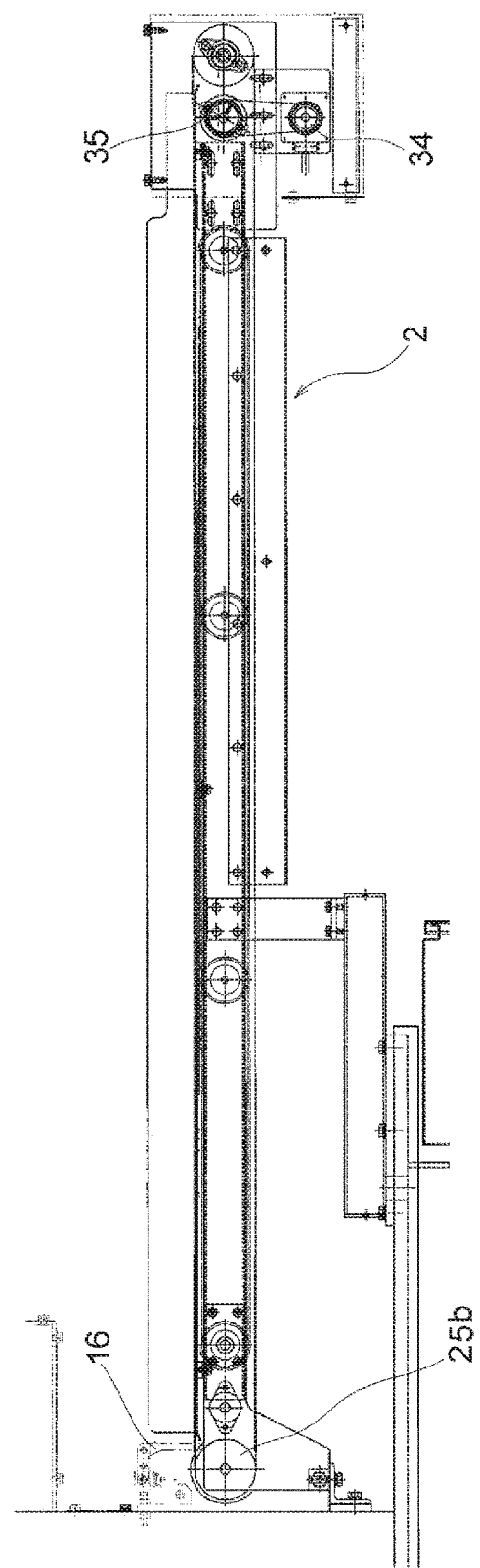
FIG. 4 is a schematic left side elevation of the bag feed conveyor of the bag feeding device as illustrated in FIG. 1.

Furthermore, the bag feed conveyor 2 provided with the conveyor width adjusting mechanism 20 has a width adjusting motor 34 mounted on the upstream end thereof as illustrated in FIG. 4. A rotative force of the width adjusting motor 34 is transmitted to the width adjusting screw 21a through a width adjusting pulley 35 as illustrated in FIG. 4 or 5.

A width adjusting sprocket 36a is fixed to the other widthwise end of the width adjusting screw 21a. Another width adjusting sprocket 36b is fixed to the other widthwise end of the width adjusting screw 21b provided at the downstream end. A chain (not illustrated) extends between the width adjusting sprockets 36a and 36b. As a result, upon drive of the width adjusting motor 34, the width adjusting screws 21a and 21b are rotated synchronously.

Figure 7:
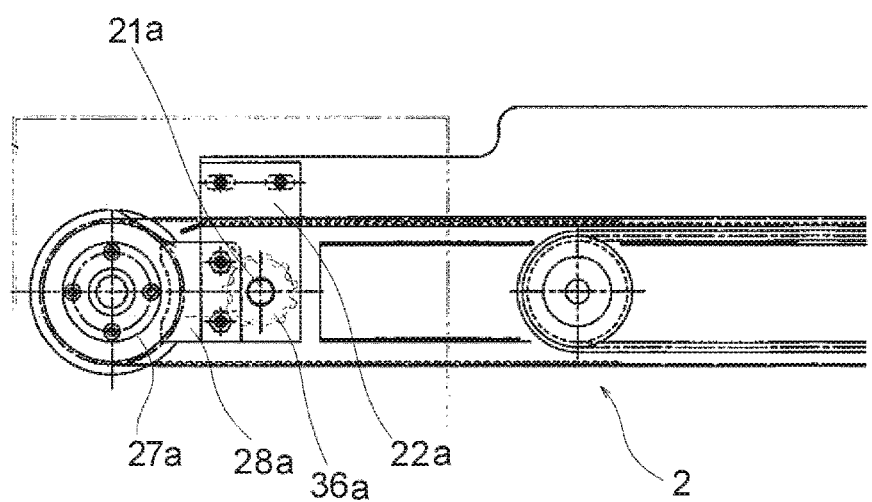
FIG. 7 is a schematic right side elevation of the vicinity of upstream end of the bag feed conveyor of the bag feeding device as illustrated in FIG. 1.
Figure 10:
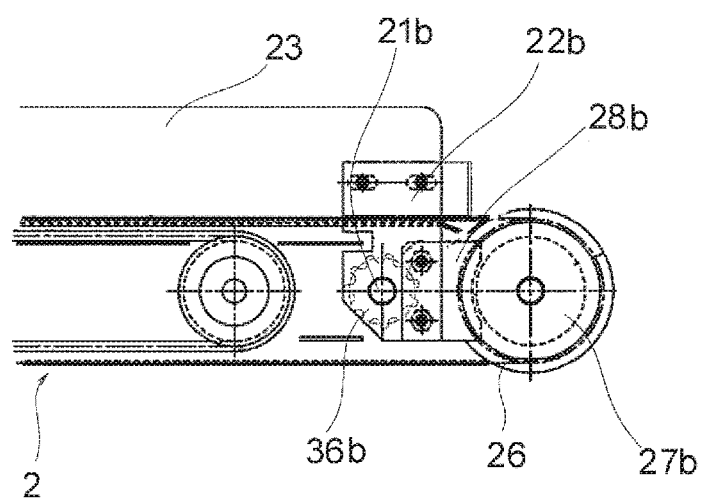
FIG. 10 is a schematic right side elevation of the vicinity of downstream end of the bag feed conveyor of the bag feeding device as illustrated in FIG. 1.

Furthermore, the width adjusting guide members 28a and 28b are provided in the screw receiving members 22a and 22b respectively as described above. The movable side pulleys 27a and 27b are engaged with the width adjusting guide members 28a and 28b near the upstream end or the downstream end so as to be movable in the width direction with widthwise movement of the screw receiving members 22a and 22b, as illustrated in FIG. 7 or 10.

The width adjusting screws 21a and 21b are synchronously rotated when the width adjusting motor 34 is driven. With rotation of the width adjusting screws 21a and 21b, the screw receiving members 22a and 22b are moved on the respective width adjusting screws 21a and 21b in the same direction by the same distance. The stock guide 23 is moved with the movement of the screw receiving members 22a and 22b, so that a widthwise separation distance between the fixed and movable stock guides 33 and 23 is varied with the result that the conveyor width is adjusted. On the other hand, the movable side pulleys 27a and 27b engaged with the respective width adjusting guide members 28a and 28b are also moved with the movement of the screw receiving members 22a and 22b. Accordingly, a widthwise separation distance between the first and second conveyor belts 24 and 26 is varied.

Figure 11:
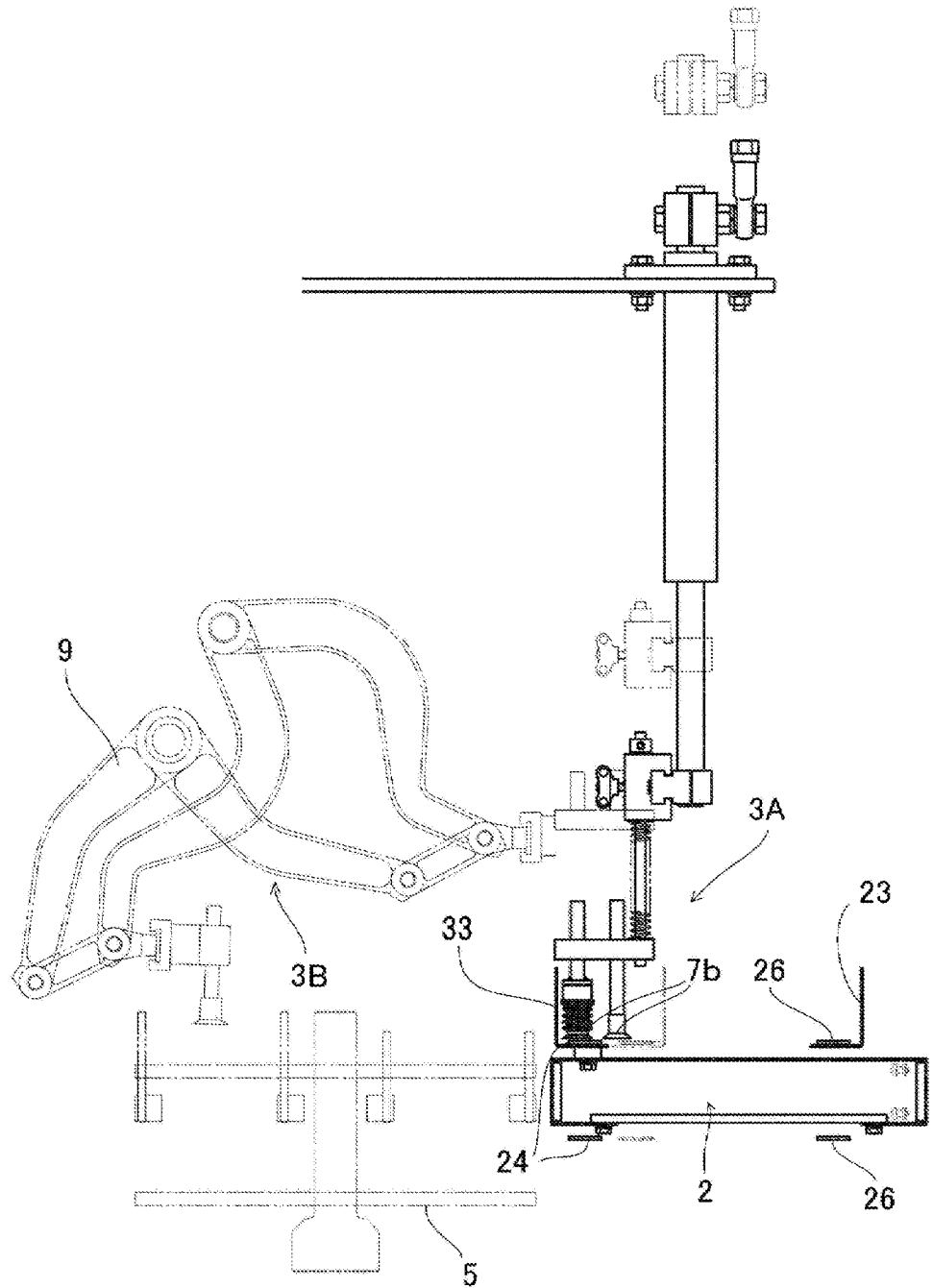
FIG. 11 is a schematic front view of the vicinity of a first bag capture unit of the bag feeding device as illustrated in FIG. 1.

The packaging bags a are sequentially conveyed on the bag feed conveyor 2, and the bag capture unit 3 is configured to capture the packaging bags a one by one. In the embodiment, as illustrated in FIG. 11 or 12, the bag capture unit 3 includes the first bag capture unit 3A which captures and raises the sequentially conveyed packaging bags a one by one and the second bag capture unit 3B which receives the packaging bags a captured by the first bag capture unit 3A and transfers the received packaging bags a to the bag placement section 5 adjacent to the one widthwise end of the bag feed conveyor 2, as illustrated in FIG. 13.

Figure 12:
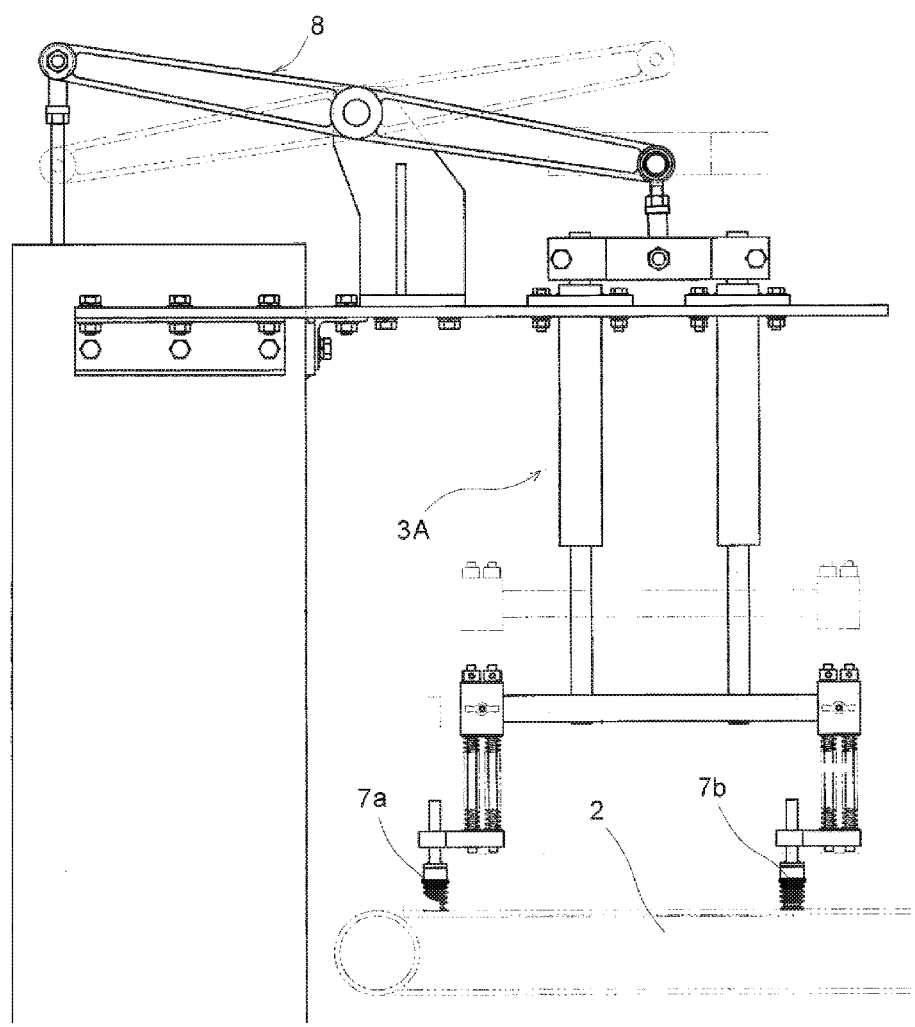
FIG. 12 is a schematic left side elevation of the first bag capture unit as illustrated in FIG. 1.

The first bag capture unit 3A is provided on the one widthwise end of the bag feed conveyor 2 at the downstream side of the bag feed conveyor 2 and has elevating equipment 8 for raising and lowering two pairs of suction pads 7a and 7b provided in a feeding direction, so that the first bag capture unit 3A takes only one of the packaging bags a conveyed to the downstream side by the bag feed conveyor 2, as illustrated in FIG. 12.

Figure 13:
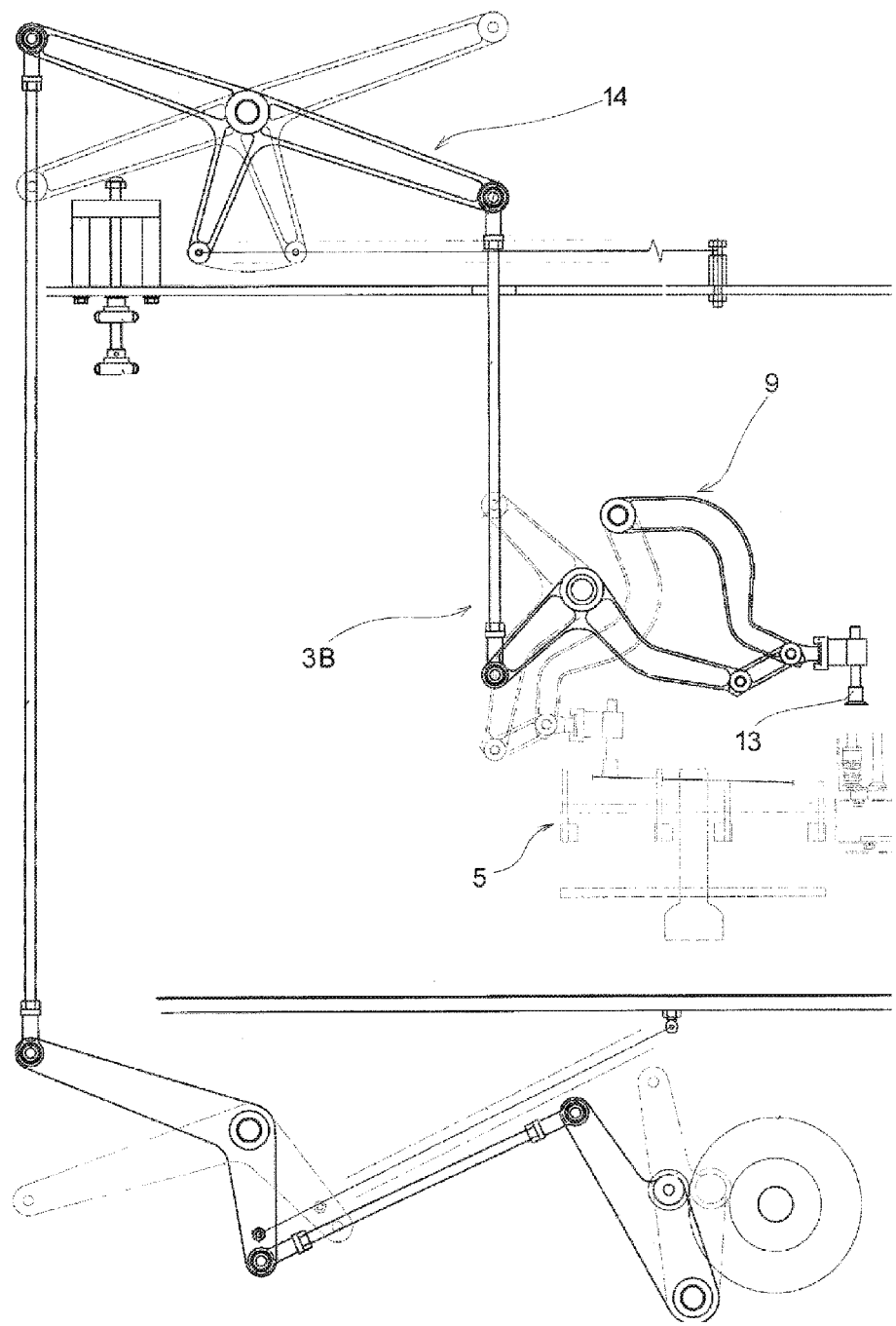
FIG. 13 is a schematic front view of the vicinity of a second bag capture unit of the bag feeding device as illustrated in FIG. 1.

The second bag capture unit 3B has a suction pad 13 provided on a distal end of a link mechanism 9 and an elevating mechanism 14 for raising and lowering the link mechanism 9 in order to receive and transfer the packaging bag a raised by the first bag capture unit 3A to the bag placement section 5, as illustrated in FIG. 13. The second bag capture unit 3B receives the packaging bag a from the first bag capture unit 3A by adsorption of the suction pad 13. The second bag capture unit 3B then locates the received packaging bag a above the bag placement section 5 by rotative movement with the lowering of the link mechanism 9 and thereafter places the packaging bag a on an upper surface of the bag placement section 5 by cancellation of adsorption by the suction pad 13.

The packaging bag a captured by the bag capture unit 3 is placed on the bag placement section 5. The bag placement section 5 has the bag position correction unit 4 for correcting the position of the packaging bag a on the bag placement section 5 in a width or longitudinal direction with respect to the packaging bag a.

Thus, in the bag feeding device 1 of the embodiment, the packaging bags a are placed on the bag placement section 5 one by one and re-placed at more accurate positions one by one by the bag position correction unit 4. Accordingly, the worker is allowed to place the packaging bags a on the bag feed conveyor 2 in a rough manner.

More specifically, as illustrated in FIG. 25(1), even the zip-fastener bags, gusset bags and the like may roughly be placed on the bag feed conveyor 2 and need not be accurately placed so as to be separated from one another little by little like "sashimi" or sliced pieces of raw fish in Japanese cooking. On the other hand, flat bags, large-sized bags such as sacks and the like may be placed on the bag feed conveyor 2 in a bundle as illustrated in FIG. 25(2). Thus, every type of packaging bag can be used with the bag feeding device 1. The packaging bag a conveyed to the downstream side is detected by the bag distal end detector 16 provided at the downstream side of the bag feed conveyor 2. The bag feed motor 29 is then stopped intermittently so that the packaging bags a are transferred one by one to the bag placement section 5 by the bag capture unit 3 thereby to be placed on the bag placement section 5. The packaging bags a are then re-placed on more accurate positions by the bag position correction unit 4 respectively.

The bag position correction unit 4 includes the first bag position correction unit 15A which corrects the position of the packaging bag a with respect to the width direction of the packaging bag a and the second bag position correction unit 15B which corrects the position of the packaging bag a with respect to the longitudinal direction of the packaging bag a.

Figure 17:
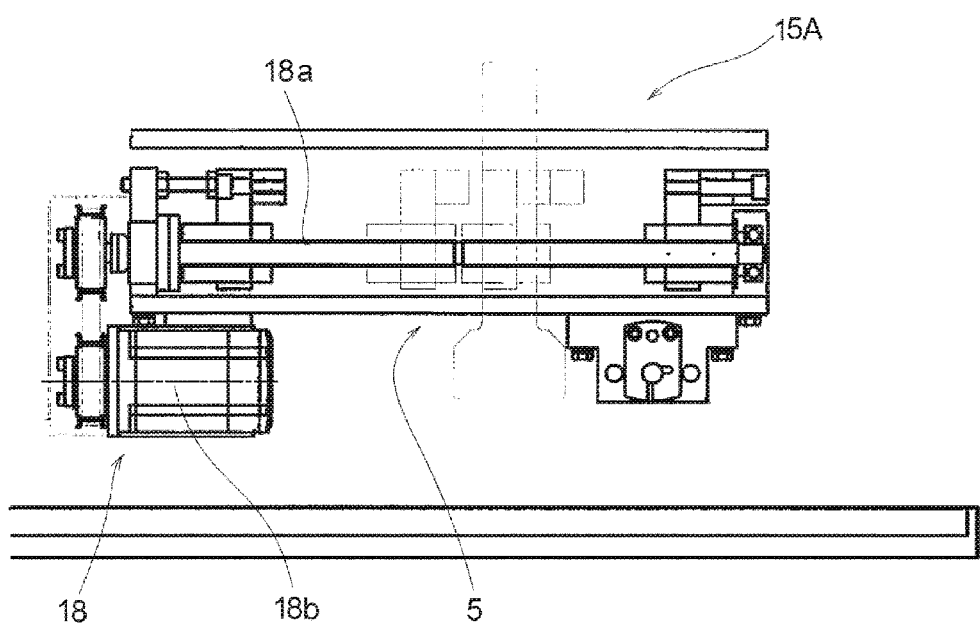
FIG. 17 is a schematic front view of the bag position correcting unit of the bag feeding device as illustrated in FIG. 14.
Figure 18:
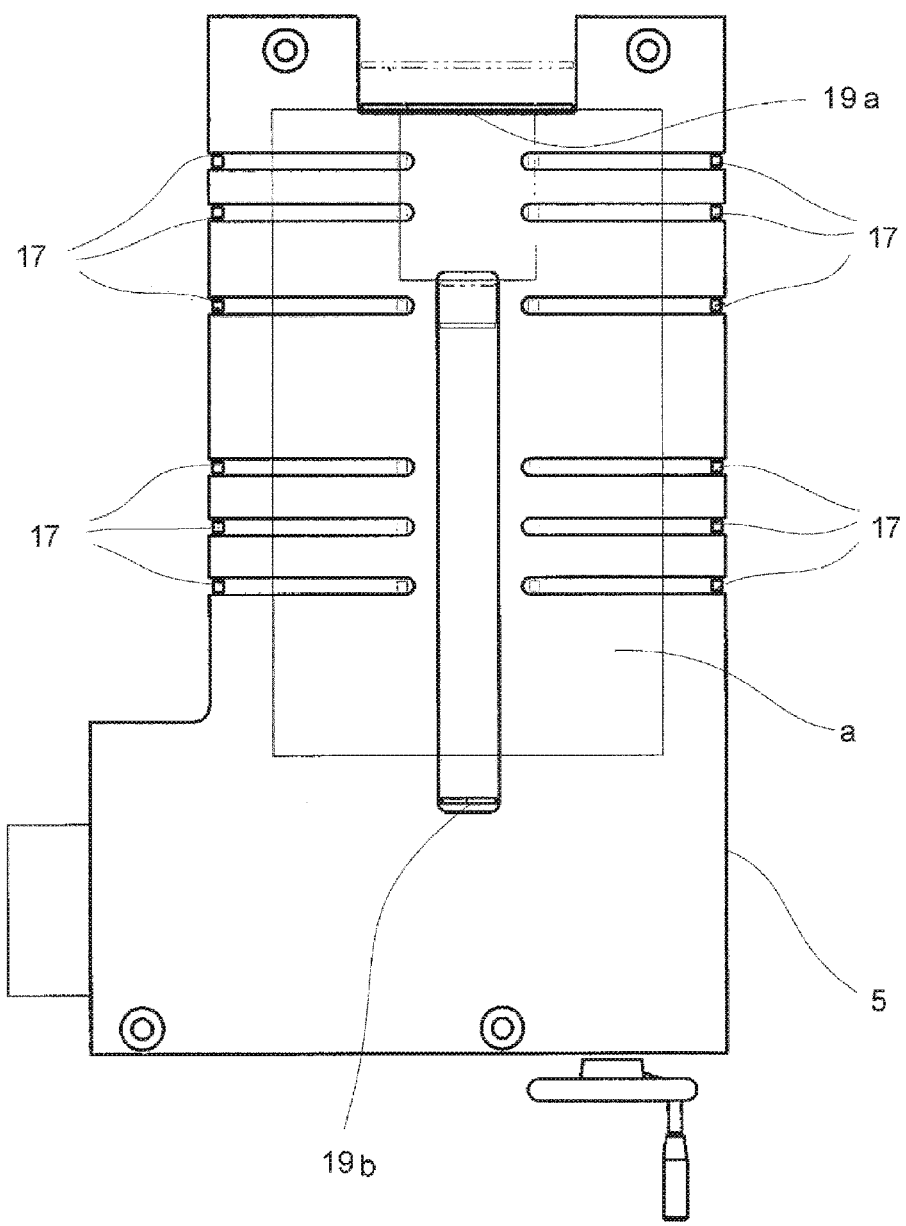
FIG. 18 is a schematic plan view of the bag placement section of the bag feeding device as illustrated in FIG. 14.

The first bag position correction unit 15A has lateral positioning pins 17 provided to protrude above at both widthwise sides thereof and to be dotted in the longitudinal direction, as illustrated in FIG. 18 and an expansion/contraction unit 18 (right and left width adjusting screws 18a and a width adjustment motor 18b) for increasing/reducing a widthwise separation distance between the lateral positioning pins 17, as illustrated in FIG. 17. Every time one packaging bag a is placed on the bag placement section 5, the width adjustment motor 18b is driven to move the lateral positioning pins 17 inward thereby to reduce the separation distance. With the reduction of the separation distance, the position of the packaging bag a is corrected with respect to the width direction. After correction of the widthwise position, the width adjustment motor 18b is driven to move the lateral positioning pins 17 outward thereby to increase the separation distance. With the increase of the separation distance, the lateral positioning pins 17 returns to the respective initial positions.

Figure 15:
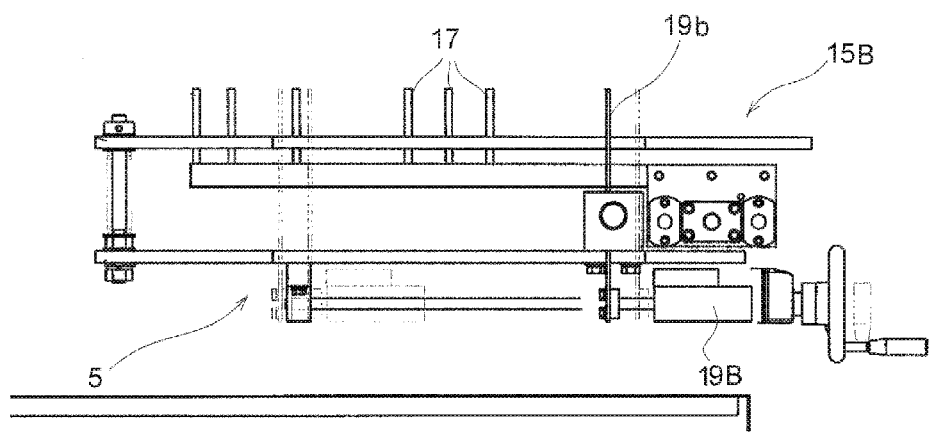
FIG. 15 is a schematic left side elevation of a bag position correcting unit of the bag feeding device as illustrated in FIG. 14.
Figure 16:
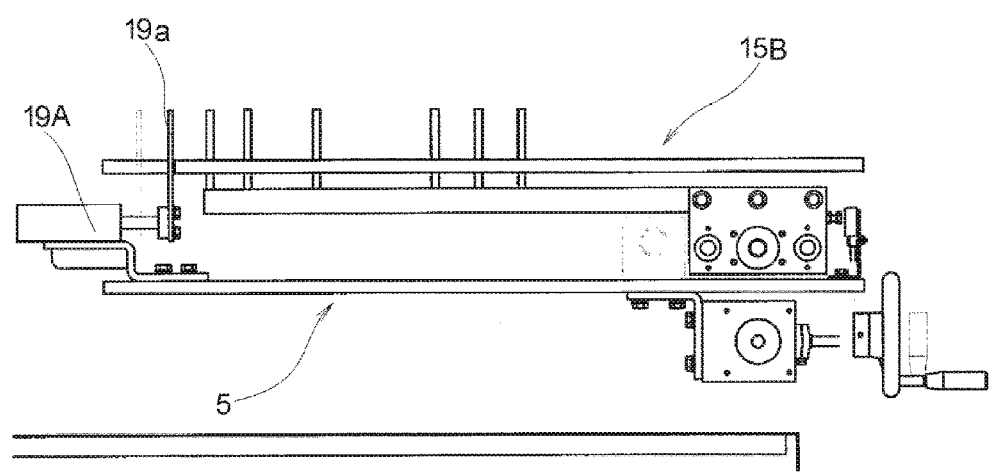
FIG. 16 is also a schematic left side elevation of the bag position correcting unit of the bag feeding device as illustrated in FIG. 14.

The second position correction unit 15B includes a bag front positioning plate 19a and a bag rear positioning plate 19b provided to protrude above at both longitudinal sides thereof and to be dotted in the widthwise direction as illustrated in FIG. 18, a bag front positioning cylinder 19A for reciprocally moving the bag front positioning plate 19a in the longitudinal direction as illustrated in FIG. 16, and a bag rear positioning cylinder 19B for reciprocally moving the bag rear positioning plate 19b in the longitudinal direction as illustrated in FIG. 15. Every time one packaging bag a is placed on the bag placement section 5, the bag front and rear positioning cylinders 19A and 19B are actuated to reduce the longitudinal separation distance between the bag front and rear positioning plates 19a and 19b with the result that the position of the packaging bag a is corrected with respect to the longitudinal direction. After correction of the longitudinal position, the bag front and rear positioning cylinders 19A and 19B are actuated to return the bag front and rear positioning plates 19a and 19b to the respective initial positions.

Figure 14:
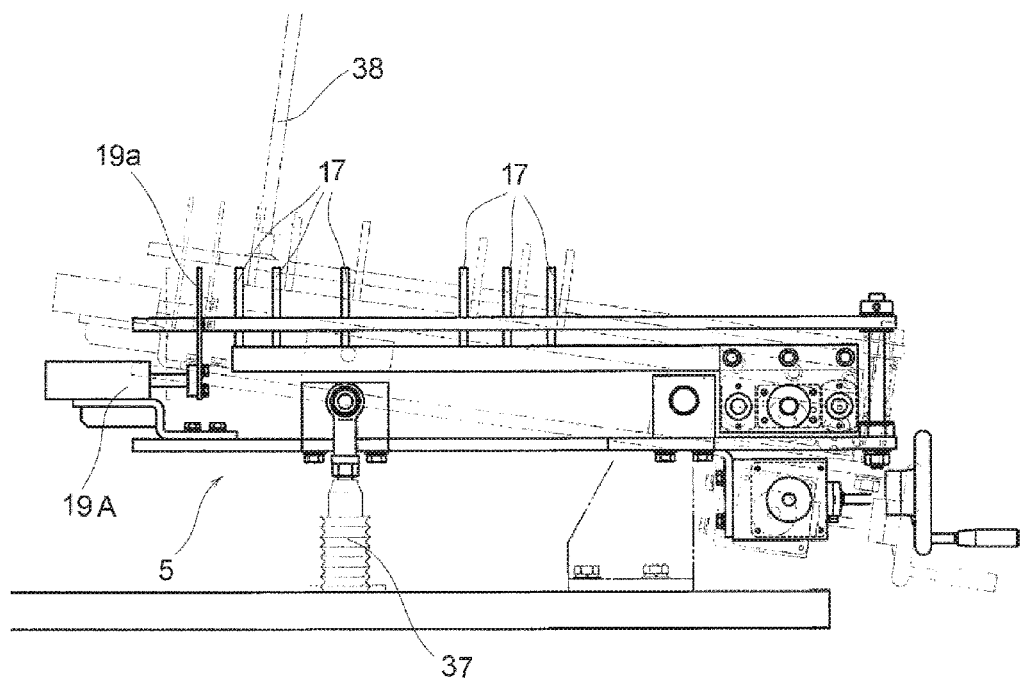
FIG. 14 is a schematic left side elevation of a bag placement section of the bag feeding device as illustrated in FIG. 1.

Furthermore, the bag placement section 5 includes an elevating device 37 for raising the distal end side of the bag placement section 5 as illustrated in FIG. 14. The distal end side of the bag placement section 5 is raised when one packaging bag a is to be held by the bag feed unit 6A. As a result, a stroke of bag feed pipes 38 of the bag feed unit 6A can be rendered shorter, and one packaging bag a can reliably be held by the bag feed pipes 38 of the bag feed unit 6A.

The bag feed unit 6 is provided for holding one packaging bag a arranged on the bag placement section 5 and feed the held packaging bag a to the bag holding units g. The bag feed unit 6 includes a first bag feed unit 6A for holding one packaging bag a placed on the bag placement section 5 and a second bag feed unit 6B which passes the packaging bag a to the bag holding units (the grip pairs) of the packaging machine P after having received the packaging bag a held by the first bag feed unit 6A.

Figure 19:
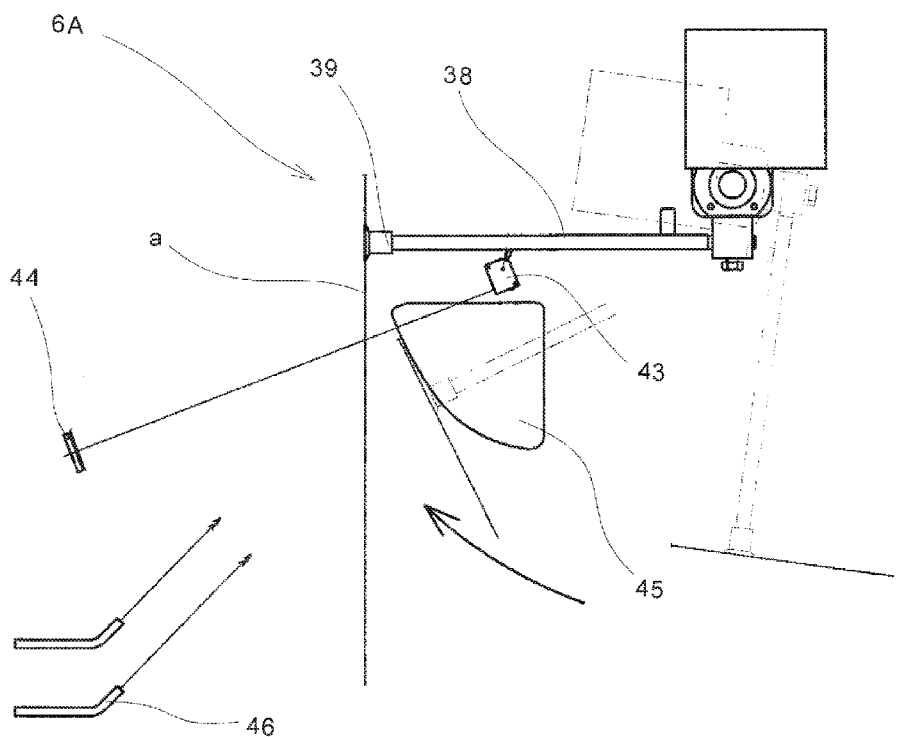
FIG. 19 is a schematic left side elevation of a first bag supply unit in the bag feeding device as illustrated in FIG. 1.

The first bag feed unit 6A includes the paired bag fee pipes 38 which hold one packaging bag a arranged on the bag placement section 5 and are then rotatively moved so that the packaging bag a assumes a vertical position, and the bag feed pipes 38 have lower ends provided with suction pads 39 adsorbing the packaging bag a from the upper surface side, as illustrated in FIG. 19. In FIG. 19, reference numeral 44 designates a reflection plate, reference numeral 45 designates a detection guide plate and reference numeral 46 designates a detection auxiliary air pipe.

Figure 20:
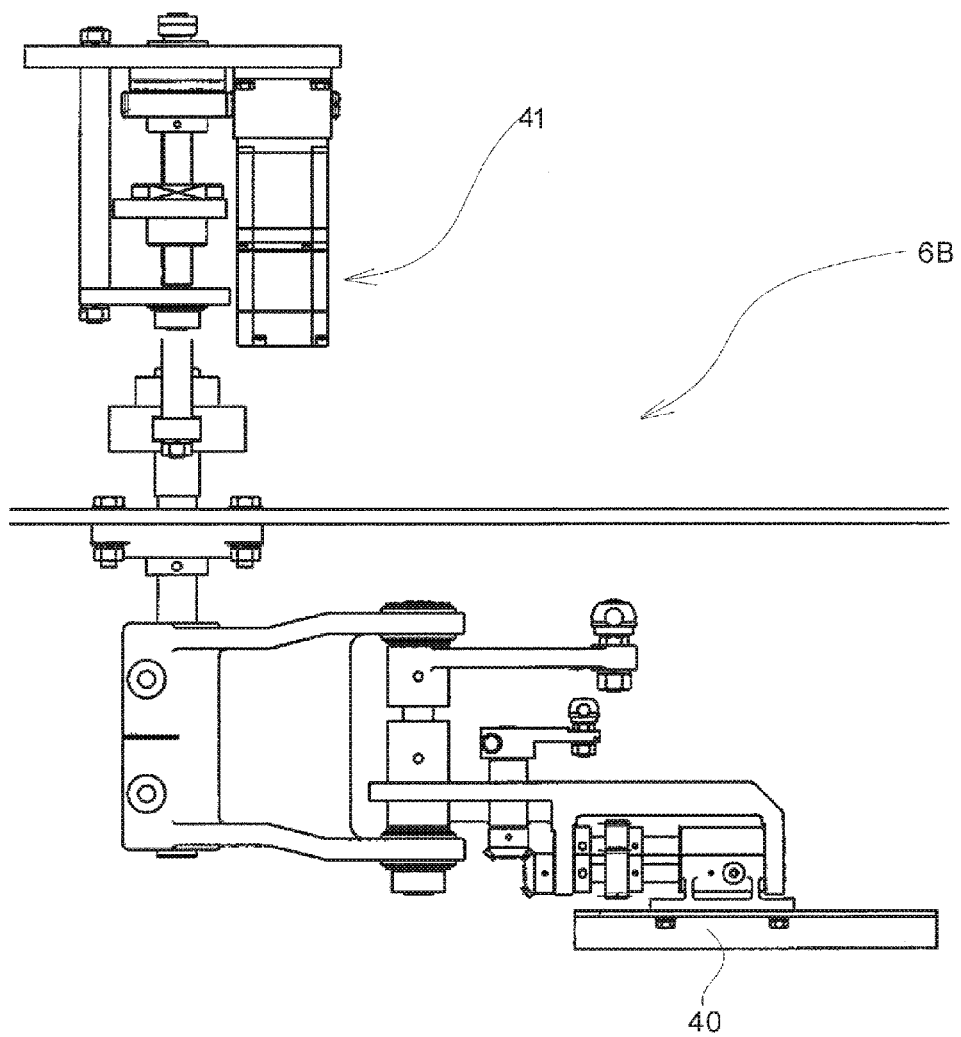
FIG. 20 is a schematic front view of a second bag supply unit in the bag feeding device as illustrated in FIG. 1.
Figure 21:
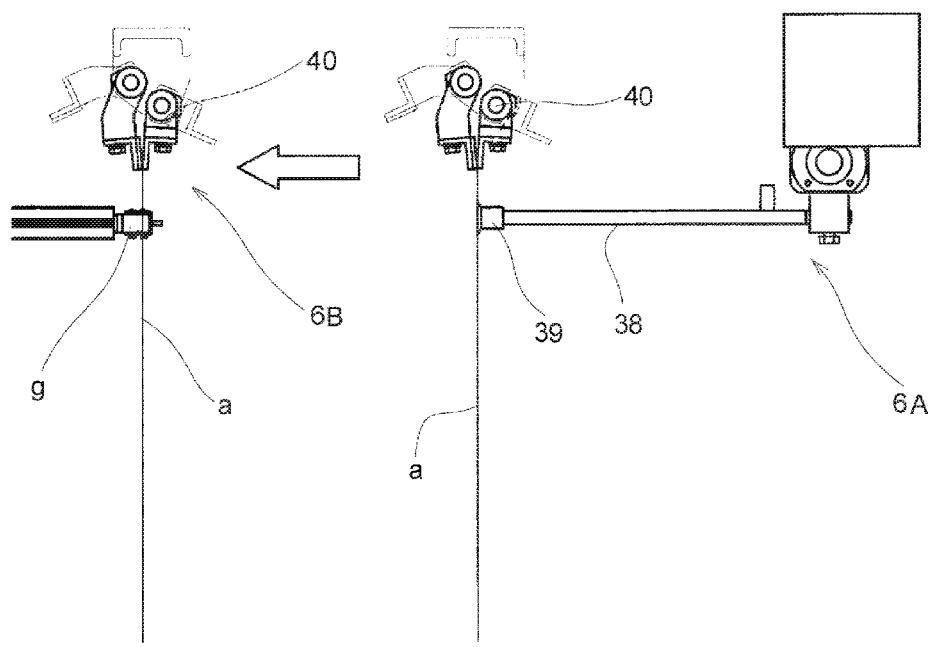
FIG. 21 is a schematic left side elevation of the second bag supply unit in the bag feeding device as illustrated in FIG. 1, explaining the operation of a height correction unit.

The second bag feed unit 6B includes a pair of holding plates 40 provided to be capable of holding one packaging bag a supported in the vertical position by the paired bag feed pipes 38 of the first bag feed unit 6A in order to receive the packaging bag a and an elevating mechanism 41 raising and lowering the holding plates 40, as illustrated in FIG. 20 or 21.

Furthermore, the bag feed unit 6 includes a height correction unit 42 which corrects the height of the packaging bag a held in the vertical position, as illustrated in FIGS. 21 to 24. The packaging bags a include those having a shorter length and a longer length of parts located above claws in the case where the packaging bag a is held by the bag holding unit (the grip pairs) as illustrated in FIG. 21. Accordingly, the packaging bag a held in the vertical position by the paired holding plates 40 of the second bag feed unit 6B is raised or lowered before being held by the bag holding unit g, whereby the packaging bags a having different lengths above claws can be held by the bag holding unit g with more appropriate length.

The height correction unit 42 includes the elevator 41 raising/lowering the paired holding plates 40 of the second bag feed unit 6B, a rotary encoder generating pulses with raise of the paired bag feed pipes 38 of the first bag feed unit 6A holding the packaging bag a, a pulse counter counting the pulses generated by the rotary encoder, a sensor 43 provided between a holding position where the packaging bag a is held by the paired bag feed pipes 38 and a receiving position where the packaging bag a is received by the paired holding plates 40 of the second bag feed unit 6B, and a control section controlling these components.

The pulse counter counts pulses generated for a time period between raise of the paired bag feed pipes 38 holding the packaging bag a and detection of the passing of the upper end side of the packaging bag a by the sensor 43, thereby obtaining an actual pulse number. The control section compares the obtained pulse number with a reference pulse number, thereby obtaining a comparative amount. The control section controls a vertical movement of the holding plates 40 by the elevating mechanism 41 according to the comparative amount.

Figure 22:
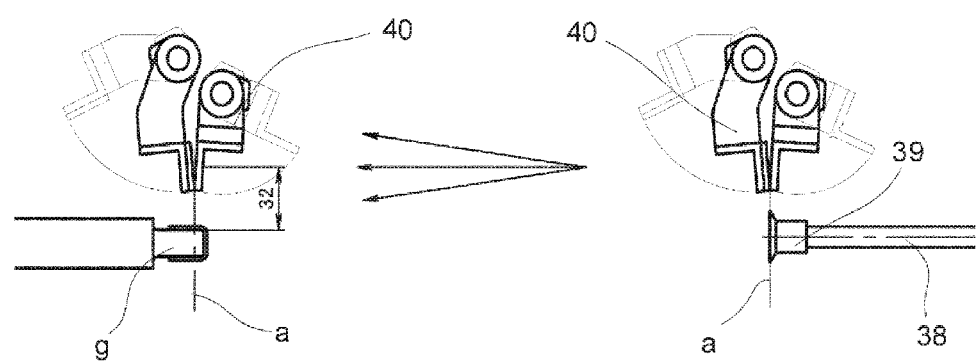
FIG. 22 is also a schematic left side elevation of the second bag supply unit in the bag feeding device as illustrated in FIG. 1, explaining the operation of the height correction unit.

More specifically, in the embodiment, the length of the packaging bag a between the part corresponding to the claws (the grip pairs) and the upper edge thereof is input onto a panel thereby to be set between 25 mm and 47 mm, as illustrated in FIG. 22. For example, as illustrated in FIG. 22, when the length is set to 32 mm and the sensor 43 detects the paired bag feed pipes 38 of the first bag feed unit 6A, the control section obtains a difference between obtained timing and normal timing by the comparison with the reference pulse number and calculates an amount of correction of the height of the packaging bag a held at the vertical position by the bag feed pipes 38. The paired holding plates 40 of the second bag feed unit 6B, which has received the packaging bag a from the bag feed pipes 38 within a range of ±5 mm, are raised/lowered. In the case of the set length of 32 mm, the holding plates 40 are moved horizontally without the raise/the lowering when an amount of correction is zero. When the correction is necessary within the range of ±5 mm, the holding plates 40 are raised/lowered accordingly, with the result the packaging bag a can be fed to the bag holding unit (the paired grips) with a desired accurate length.

Figure 23:
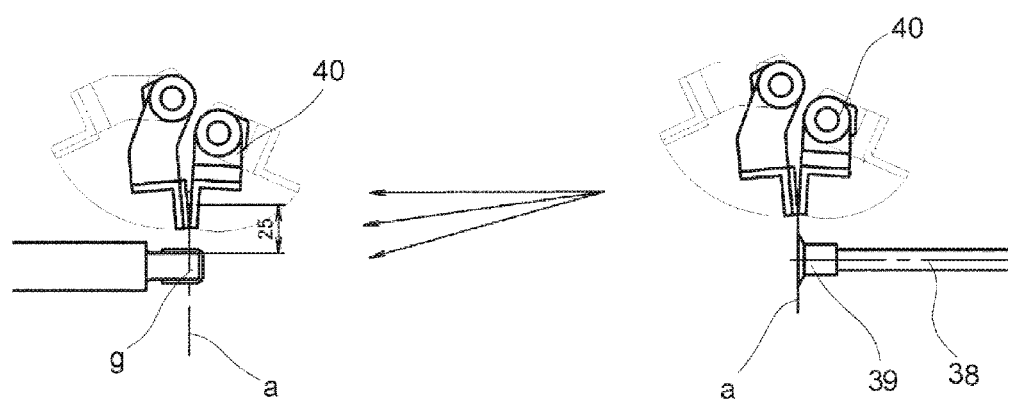
FIG. 23 is further a schematic left side elevation of the second bag supply unit in the bag feeding device as illustrated in FIG. 1, explaining the operation of the height correction unit.

Furthermore, for example, as illustrated in FIG. 23, when the length is set to 25 mm and the sensor 43 detects the paired bag feed pipes 38 of the first bag feed unit 6A, the control section obtains a difference between obtained timing and normal timing by the comparison with the reference pulse number and calculates an amount of correction of the height of the packaging bag a held at the vertical position by the bag feed pipes 38. The paired holding plates 40 of the second bag feed unit 6B, which has received the packaging bag a from the bag feed pipes 38 within a range of ±5 mm, are raised/lowered. In the case of the set length of 32 mm, the holding plates 40 are lowered 7 mm when an amount of correction is zero. When the correction is necessary, the holding plates 40 are lowered accordingly, with the result the packaging bag a can be fed to the bag holding unit (the grip pairs) with a desired accurate length.

Figure 24:
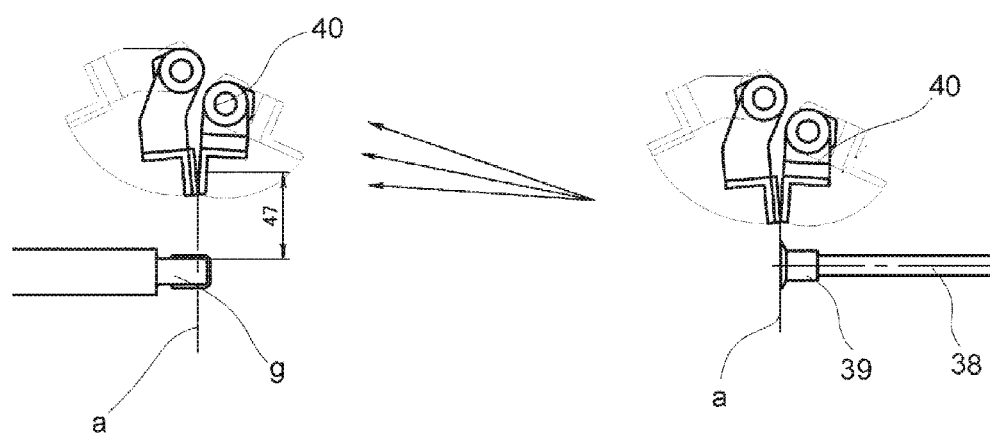
FIG. 24 is still further a schematic left side elevation of the second bag supply unit in the bag feeding device as illustrated in FIG. 1, explaining the operation of the height correction unit.

Still furthermore, for example, as illustrated in FIG. 24, when the length is set to 47 mm and the sensor 43 detects the paired bag feed pipes 38 of the first bag feed unit 6A, the control section obtains a difference between obtained timing and normal timing by the comparison with the reference pulse number and calculates an amount of correction of the height of the packaging bag a held at the vertical position by the bag feed pipes 38. The paired holding plates 40 of the second bag feed unit 6B, which has received the packaging bag a from the bag feed pipes 38 within a range of ±5 mm, are raised/lowered. In the case of the set length of 47 mm, the holding plates 40 are raised 15 mm when an amount of correction is zero. When the correction is necessary, the holding plates 40 are raised accordingly, with the result the packaging bag a can be fed to the bag holding unit (the grip pairs) with a desired accurate length.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A bag feeding device comprising:
   a bag feed conveyor configured to sequentially convey packaging bags;
   a bag capture unit configured to capture the packaging bags one by one, the packaging bags being sequentially conveyed by the bag feed conveyor;
   a bag placement section where the packaging bags captured by the bag capture unit are placed one by one, the bag placement section being provided with a bag position correction unit; and
   a bag supply unit configured to hold the packaging bag placed on the bag placement section to supply the packaging bag to a bag holding unit of a packaging machine, wherein
   the bag capture unit includes
      a first bag capture unit configured to capture and then to raise the packaging bags sequentially conveyed by the bag feed conveyor, one by one, and
      a second bag capture unit configured to receive the packaging bags captured by the first bag capture unit one by one and to transfer the packaging bags one by one to a bag arrangement section adjacent to an outside at one widthwise end side of the bag feed conveyor.

2. The device according to claim 1, wherein the bag feed conveyor has a conveyor width adjusting mechanism configured to adjust a width of the bag feed conveyor.

3. The device according to claim 2, wherein the conveyor width adjusting mechanism includes:
   a pair of width adjusting screws rotatably provided in a widthwise direction of the bag feed conveyor;
   a pair of screw receiving members mounted on the adjusting screws and movable in the widthwise direction with rotative movement of the width adjusting screws, respectively;
   a movable stock guide movable in the widthwise direction together with the screw receiving members;
   fixed side pulleys provided on one of widthwise end sides of the bag feed conveyor with a first conveyor belt extending therebetween; and
   movable side pulleys provided on the other of the widthwise end sides of the bag feed conveyor with a second conveyor belt extending therebetween,
   wherein the movable side pulleys are engaged with width adjusting guide members provided on the screw receiving members, respectively, so that the movable side pulleys are movable in a widthwise direction of the screw receiving members with widthwise movement of the screw receiving members.

4. The device according to claim 1, wherein the bag supply unit includes a height correction unit configured to correct a height of the packaging bag maintained in a vertical posture.

5. A packaging machine provided with the bag feeding device defined in claim 1.

6. The device according to claim 1, wherein
   the bag position correction unit is composed with a first position correction unit and a second position correction unit,
   the first position correction unit includes
      lateral positioning members arranged at both widthwise sides of the packaging bags and protruding above the bag feed conveyor, and
      an expansion/contraction unit configured to extend and contract a lateral distance between the lateral positioning members, which is defined in a lateral direction of the packaging bags, and
   the second position correction unit includes
      a bag front positioning member and a bag rear positioning member arranged at both longitudinal sides of the packaging bags and protruding above the bag feed conveyor,
      a bag front positioning cylinder configured to reciprocate the bag front positioning member in a longitudinal direction of the packaging bags, which is perpendicular to the lateral direction, and
      a bag rear positioning cylinder configured to reciprocate the bag rear positioning member in the longitudinal direction.

7. The device according to claim 1, wherein
   the first bag capture unit has
      a suction unit at a distal end such that only one of the packaging bags is captured, the one of the packaging bags being defined as a captured bag, and
      an elevating equipment to elevate the captured bag such that the captured bag vertically departs from a remaining of the packaging bags, the second bag capture unit has another suction unit at a distal end such that the captured bag is passed to the second bag capture unit from the first bag capture unit by switching a sectional operation between these suction units, the second bag capture unit being configured to carry the captured bag such that the captured bag is horizontally moved to be placed above the bag arrangement section.

8. The device according to claim 7, wherein the suction unit of the first bag capture unit is composed with two pairs of suction pads, one pair being to be placed at leading corners of the captured bag and the other pair being to be placed at trailing corners of the captured bag with respect to a conveying direction in which the packaging bags are conveyed.

\* \* \* \* \*